(12) United States Patent
Cosentino et al.

(10) Patent No.: US 11,922,324 B1
(45) Date of Patent: Mar. 5, 2024

(54) TRAINING MULTI-TASK NEURAL NETWORK WHILE MINIMIZING CATASTROPHIC FORGETTING

(71) Applicant: Tenyx, Inc., Palo Alto, CA (US)

(72) Inventors: Romain Cosentino, Palo Alto, CA (US); Adam Earle, Palo Alto, CA (US)

(73) Assignee: Tenyx, Inc., Palo Alto, CA (US)

( * ) Notice: Subject to any disclaimer, the term of this patent is extended or adjusted under 35 U.S.C. 154(b) by 0 days.

(21) Appl. No.: 18/318,302

(22) Filed: May 16, 2023

(51) Int. Cl.
*G06N 3/09* (2023.01)
*G06N 3/0985* (2023.01)

(52) U.S. Cl.
CPC .................. *G06N 3/0985* (2023.01)

(58) Field of Classification Search
CPC .................................................. G06N 3/0985
See application file for complete search history.

(56) References Cited

U.S. PATENT DOCUMENTS

2017/0024661 A1* 1/2017 Hunsberger ............ G06N 20/00
2020/0234128 A1* 7/2020 Lin ......................... G06N 3/04

OTHER PUBLICATIONS

Goodrich et al., "Neuron Clustering for Mitigating Catastrophic Forgetting in Feedforward Neural Networks", Jan. 15, 2015, 2014 IEEE Symposium on Computational Intelligence in Dynamic and Uncertain Environments (CIDUE), pp. 1-7. (Year: 2015).*
Teng et al., "Overcoming Catastrophic Forgetting via Direction-Constrained Optimization", Jul. 1, 2022, arXiv:2011.12581v3, pp. 1-20. (Year: 2022).*

* cited by examiner

*Primary Examiner* — Brent Johnston Hoover
(74) *Attorney, Agent, or Firm* — Nicholson De Vos Webster & Elliott LLP

(57) ABSTRACT

Techniques are described herein for a method of determining a similarity of each neuron in a layer of neurons of a neural network model to each other neuron in the layer of neurons. The method further comprises determining a redundant set of neurons and a non-redundant set of neurons based on the similarity of each neuron in the layer. The method further comprises fine tuning the set of non-redundant neurons using a first set of training data. The method further comprises training the set of redundant neurons using a second set of training data.

15 Claims, 7 Drawing Sheets

TRAINING MULTI-TASK NEURAL NETWORK WHILE MINIMIZING CATASTROPHIC FORGETTING

BACKGROUND

Machine learning involves training a machine learning model to perform one or more specific tasks. For instance, a machine learning model can be trained to perform a target task by relying on patterns and inferences learned from training data, without requiring explicit instructions pertaining to how the task is to be performed. Machine learning models have become customary in many devices and systems for performing tasks, including video processing (e.g., gesture recognition in one or more frames of a sequence of frames of a video, identifying an object in one or more frames of the sequence of frames of the video), and speech recognition (e.g., identifying a speaker in a group of speakers), among others. Training the machine learning model to perform multiple tasks can result in catastrophic forgetting, in which the machine learning model "forgets" previously acquired machine learning tasks as it learns a new task.

Catastrophic forgetting is the inability to learn multiple tasks in a sequential manner. Specifically, training a machine learning model on a new task distinct form a task already learned by the machine learning model will improve the machine learning model's capability to perform the new task and impact the machine learning model's capability to perform the previously learned task. The catastrophic forgetting problem hinders the machine learning model's robustness and training-time efficiency.

Machine learning models can be limited by the time it takes to train the model, the available training data, the tasks performed by the model, the processing power of devices implementing the machine learning model, computational resources of devices implementing the machine learning model, and the like. As such, there is a need to efficiently employ machine learning models that are capable of learning new tasks while minimizing any loss of previously learned tasks (e.g., lifelong learning).

SUMMARY

Techniques are described herein for a method of training a machine learning model to learn tasks while mitigating catastrophic forgetting. Specifically, a task management system trains a neural network to perform a first task. Subsequently, the task management system identifies redundant and non-redundant neurons used by the neural network to perform the first task. The redundant neurons are neurons that maintain the accuracy of the neural network in performing the first task. In other words, the redundant neurons are responsible for defining the decision boundary responsible for performing task 1. The redundant neurons are trained to be invariant with respect to the non-redundant neurons such that the redundant neurons can be trained to perform task 2 without affecting the accuracy of the non-redundant neurons performing task 1.

BRIEF DESCRIPTION OF THE DRAWINGS

The detailed description is described with reference to the accompanying drawings in which.

DETAILED DESCRIPTION

The architecture of a machine learning model dictates the accuracy of the model, the complexity of the model, the computational resources consumed by the model, the duration of time it takes to train the model, and the like. As a result, determining an optimal size of the machine learning model (e.g., a number of layers, a number of neurons, etc.) is complex and depends on the purpose of the machine learning model, the systems executing the machine learning model, etc. Accordingly, most machine learning models are over-parameterized. This means that a typical machine learning model is designed with more neurons than necessary to learn a single task. As a result, machine learning models generally consume more resources than necessary.

Conventional approaches attempt to optimize the size/complexity of the machine learning model by identifying redundant neurons/unnecessary hyperparameters of a machine learning model required to learn a single task. For example, conventional approaches prune neurons to decrease the size of the network without degrading the accuracy of the model in performing the single task. As a result, the size of the machine learning model is decreased, and the accuracy of the machine learning model in performing the single task is maintained.

Other conventional approaches attempt to optimize the size/complexity of the machine learning model by training the machine learning model to learn multiple tasks. For example, conventional approaches partition a neural network into isolated sub-networks, where each sub-network is trained to perform a task. As a result, a single neural network model can perform multiple tasks. However, these networks require information indicating the activation of a particular sub-network corresponding to a particular task. For example, the network must obtain information that activates sub-network two (trained to perform task two) such that the network can perform task two. As a result, these networks executing multiple isolated sub-networks behave no differently than multiple small networks trained to perform specific tasks. A common reason why such sub-networks are isolated is because of the cascading nature of neural networks. For example, in a fully connected neural network architecture, each layer, and the neurons of each layer, are interdependent. As a result, if the neurons are not isolated (e.g., by activating a particular sub-network to perform a particular task), then the activation of the entire neural network including each sub-network, degrades the accuracy of the sub-network in performing a task.

To address these and other deficiencies, the task management system of the present disclosure trains a neural network to sequentially learn tasks while minimizing catastrophic forgetting. Using a single model to perform multiple tasks efficiently conserves computing resources by reducing the training time necessary to learn the task of the model, for example.

Figure 1:
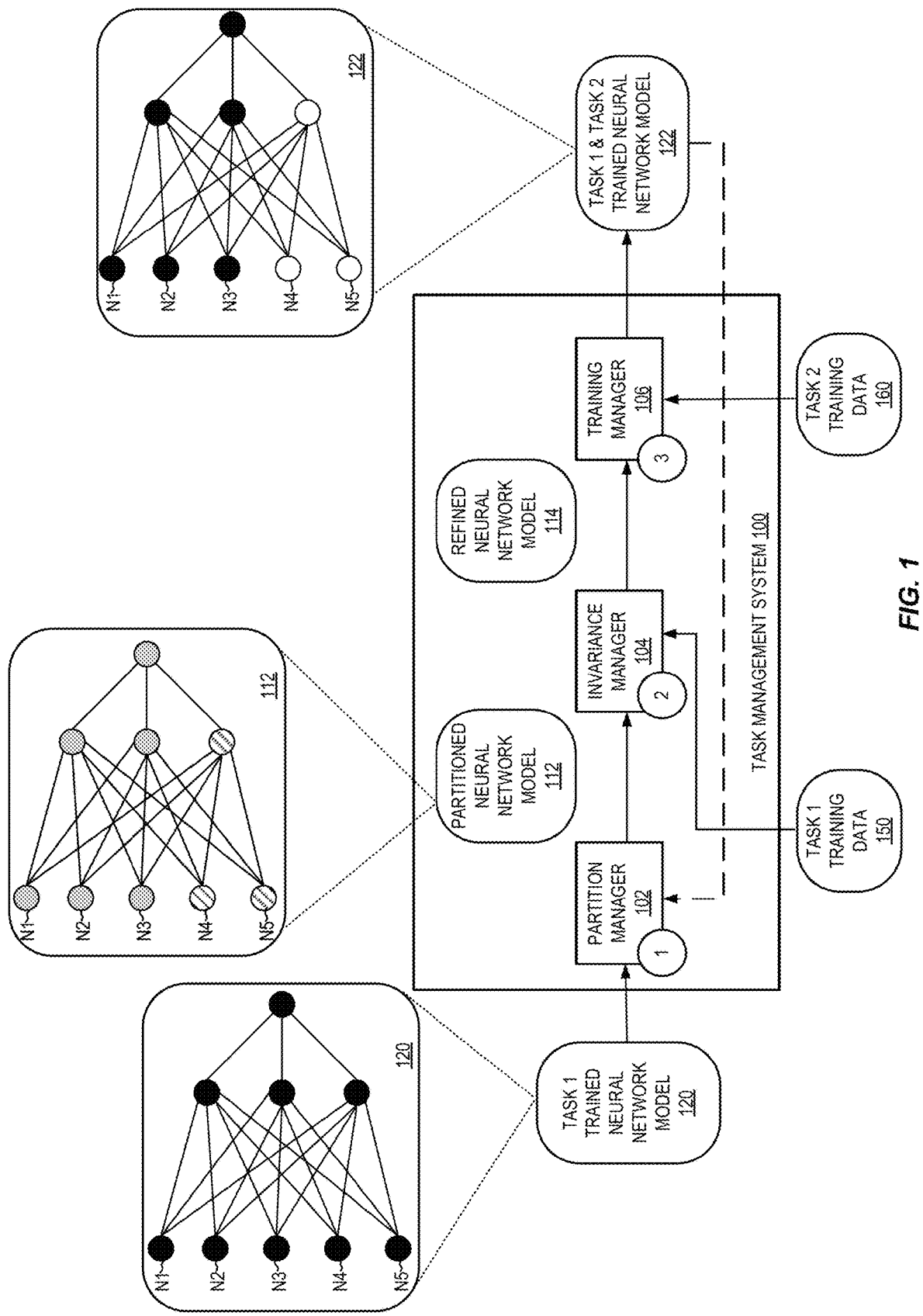
FIG. 1 illustrates an example task management system training a neural network to perform multiple tasks, in accordance with one or more embodiments.

FIG. 1 illustrates an example task management system 100 training a neural network to perform multiple tasks, in accordance with one or more embodiments. As shown in FIG. 1, embodiments may include a task management system 100 executing a partition manager 102, an invariance manager 104, and a training manager 106. In some embodiments, the task management system 100 may be incorporated into an application, a suite of applications, etc. or may be implemented as a standalone system which interfaces with an application, a suite of applications, etc. The task management system 100 may operate on any neural network model 120.

Figure 2:
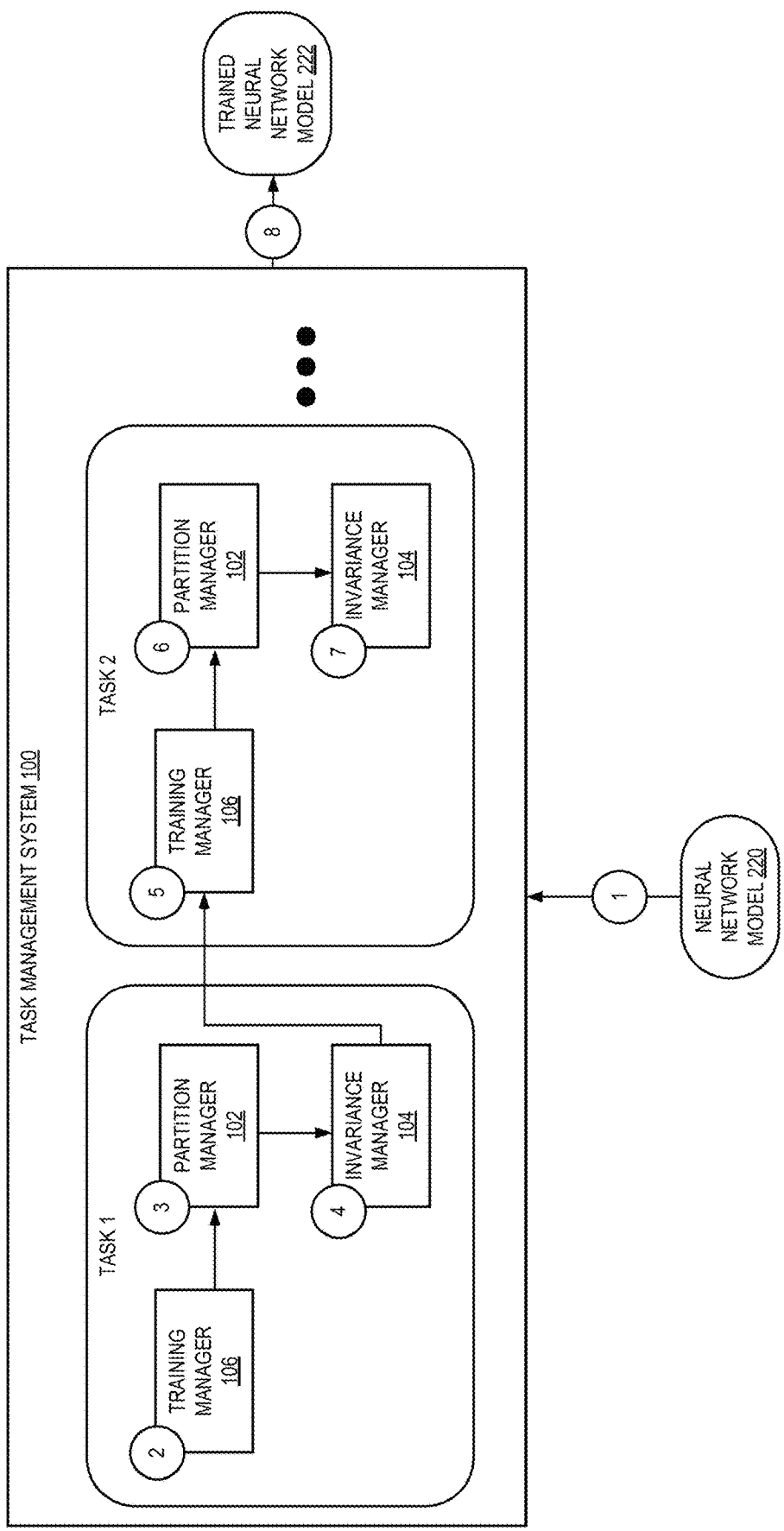
FIG. 2 illustrates a diagram of a training a neural network architecture to perform multiple tasks, in accordance with one or more embodiments.

At numeral 1, the partition manager 102 receives a fully connected neural network model trained on a first task (e.g., task 1). As shown in FIG. 1, the task 1 trained neural network model 120 includes neurons trained to perform task 1 (indicated by black circles). The task 1 trained neural network model 120 has been trained to perform task 1 using the task 1 training data 150. With reference to FIG. 2 below, in some embodiments, the task management system 100 receives an untrained neural network model 220 and trains the neural network model 220.

The partition manager 102 may perform any suitable method of partitioning neurons in each layer of the neural network model 120. Partitioning neurons in each layer of the neural network 120 includes logically differentiating neurons in a layer of the neural network 120. In some embodiments, for each layer of the task 1 trained neural network model 120, the partition manager 102 determines a regularized cosine similarity between each neuron to the other neurons in the layer. In operation, the partition manager 102 performs a cosine similarity between neurons' weight vectors. The cosine similarity (e.g., the cosine of the angle between the weight vectors) is then regularized using a distance between neurons' bias term. The distance between the neurons' bias terms is determined using an L2 loss function. The partition manager 102 creates one or more clusters of similar neurons by clustering neurons that satisfy a threshold similarity score.

Subsequently, the partition manager 102 partitions the neurons in each layer into two sets of neurons: (1) a non-redundant neuron set and (2) a redundant neuron set. As shown in FIG. 1, partitioned neural network model 112 includes a non-redundant neuron set (indicated by grey circles) and a redundant neuron set (indicated by pattern circles). In this manner, the partition manager 102 generates the partitioned neural network model 112. The neurons in the non-redundant neuron set are the neurons that drive the neural network to perform a task (such as learning to perform a first task well). In some embodiments, a task is performed well when the neural network performs the task that satisfies a threshold accuracy. In operation, the non-redundant neurons are the neurons responsible for driving the accuracy of a neural network to satisfy the threshold accuracy when performing task 1. Specifically, the neurons in the non-redundant set are identified as neurons that are not similar to other neurons. In other words, each neuron that is not clustered into a cluster of similar neurons is identified as being a non-redundant neuron. Additionally, the partition manager 102 selects a neuron from each cluster of similar neurons to identify a non-redundant neuron from the cluster of similar neurons. At least one neuron in the cluster of similar neurons (e.g., redundant neurons) is a non-redundant neuron, as the selected non-redundant neuron captures the characteristics/features learned by the redundant neurons in the cluster. In some embodiments, the partition manager 102 selects a non-redundant neuron for the non-redundant neuron set by randomly selecting neuron from the cluster of similar neurons. In other embodiments, with reference to FIG. 3, (indicating the similarity of neurons in a two-dimensional vector graph), the partition manager 102 selects a neuron from the cluster of similar neurons that has the highest magnitude.

The neurons in the redundant set are neurons that are a result of the overparameterization of the task 1 trained neural network model 120. That is, the redundant neurons do not drive the accuracy of the neural network model 120 in performing task 1 above a threshold accuracy. The partition manager 102 identifies neurons in the redundant neuron set as any remaining neurons (e.g., any neuron that has not been identified as being non-redundant) in a cluster of similar neurons. In some embodiments, the partition manager 102 aggregates each cluster of similar neurons to determine the set of redundant neurons.

Figure 3:
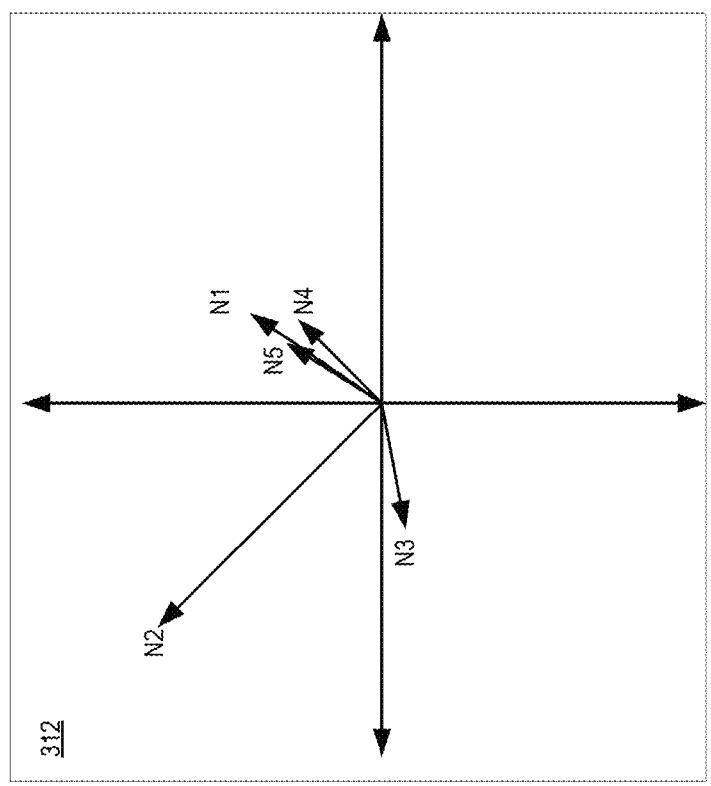
FIG. 3 illustrates an example of a partitioned neural network, in accordance with one or more embodiments.
Figure 3:
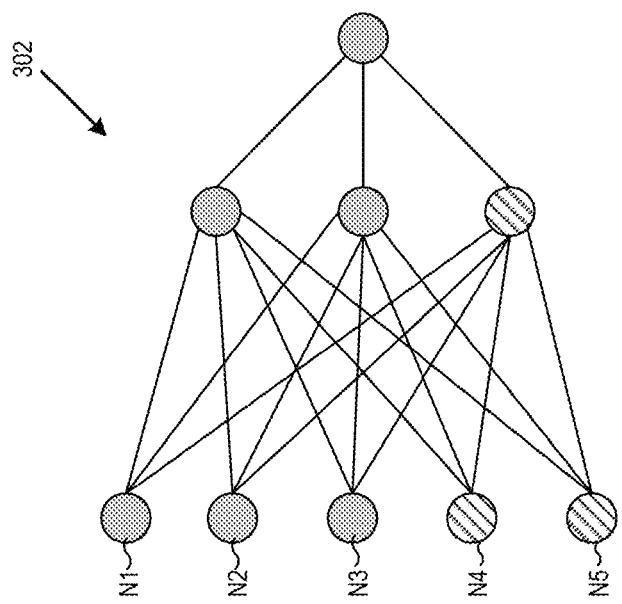

As shown, the neurons of the partitioned neural network model 112, determined by the partition manager 102, have been partitioned into two sets. The first set of neurons (Neurons N1-N3) are the set of neurons determined to be non-redundant neurons, or the neurons relevant in performing task 1 well. The second set of neurons (N4-N5) are the set of neurons determined to be redundant neurons, or the neurons that, when removed, do not affect the accuracy of the task 1 trained neural network model 120. As described herein, the redundant neurons do not drive the accuracy of the neural network model 120 in performing task 1 above a threshold accuracy (e.g., the neurons not relevant in performing task 1 well.) FIG. 3 described below further illustrates the redundant and non-redundant neurons of a neural network model.

At numeral 2, the invariance manager 104 receives the partitioned neural network model 112 from the partition manager 102 and the task 1 training data 150. The invariance manager 104 trains the partitioned neural network model 112 for an additional round of training using the task 1 training data 150. In particular, the invariance manager 104 fine tunes the non-redundant neurons (e.g., N1-N3) of the partitioned neural network model 112, reinforcing the learning of the non-redundant neurons to perform task 1. In one example implementation, the invariance manager 104 propagates error to the non-redundant neurons. For instance, the invariance manager 104 applies the backpropagation algorithm to the non-redundant neurons only. In operation, the invariance manager 104 determines only the gradient of the neurons with respect to the non-redundant neurons identified for task 1.

Additionally, during the fine tuning of the non-redundant neurons at numeral 2, the invariance manager 104 perturbs each of the redundant neurons (N4-N5). Perturbing the redundant neurons includes applying a random noise to the redundant neurons (e.g., applying the random noise to a weight vector of each redundant neuron). For example, the invariance manager 104 applies a group-based transformation (such as an affine transformation) inducing a change in the neuron's vector direction. Non-limiting examples of group transformations on the weights of the neurons include rotation transformations, translation transformations, shearing transformations, etc.

In some embodiments, the invariance manager 104 constrains the perturbations applied to the redundant neurons. For example, the invariance manager 104 constrains a random perturbation to the redundant neuron in a sub-space. The sub-space may be the space with an increased probability of the redundant neuron learning a new task. The sub-space may be manually determined (e.g., predefined) and/or dynamically determined (e.g., via training and decreasing error over a number of iterations).

Using the invariance manager 104 to fine tune the non-redundant neurons using the task 1 training data 150 increases the ability of the non-redundant neurons to capture features used to learn task 1. Moreover, by perturbing the redundant neurons, the invariance manager 104 reduces the dependency of the task 1 trained neural network model 120 on the redundant neurons. That is, the task 1 trained neural network model 120 can perform task 1 with a reduced dependence on any weight applied by the redundant neurons. In this manner, while the neurons in each layer of the partitioned neural network model 112 are still dependent on neurons in previous layers of the partitioned neural network model 112 by nature of being connected to neurons in previous layers, the reliance on redundant neurons is reduced. In operation, the invariance manager 104 is creating refined neural network model 114 by forcing independence of the non-redundant neurons from the redundant neurons of the partitioned neural network model 112.

At numeral 3, the training manager 106 receives the refined neural network model 114 and task 2 training data 160. The training manager 106 trains the refined neural network model 114 to perform task 2 using any suitable mechanism such as supervised learning. In particular, the training manager 106 trains the redundant neurons of the refined neural network model 114, which were determined using the partition manager 102 at numeral 1 (e.g., neurons N4-N5), to perform task 2 using the received task 2 training data 160. In one example implementation, the training manager 106 propagates error only to the redundant neurons when training the redundant neurons for task 2. For instance, the training manager 106 applies the backpropagation algorithm to the redundant neurons only. In operation, the training manager 106 determines only the gradient of the neurons with respect to the redundant neurons (e.g., neurons N4-N5).

In some embodiments, the training of the redundant neurons is constrained in a sub-space. As described herein, as a result of the invariance performed by the invariance manager 104, the non-redundant neurons are theoretically able to perform task 1 without any dependence on the redundant neurons. However in practice, the redundant neurons may affect the non-redundant neurons of previous layers in the neural network model because of the intrinsic compositional nature of deep neural networks. By limiting the sub-space of the training performed on the redundant neurons, the changes applied to the redundant neurons' weight is constrained. As a result, the redundant neurons may be limited in terms of learning possible feature/characters of task 2. Therefore, while the non-redundant neurons may maintain a threshold accuracy performance associated with performing task 1, the redundant neurons may not perform task 2 at a threshold accuracy performance. Increasing the size in the sub-space allows the redundant neurons to learn new tasks that are not related to task 1 and perform well on such new tasks. However, increasing the size of the sub-space may also decrease the accuracy of the non-redundant neurons in performing task 1. In some embodiments, the training is constrained to the same sub-space as described in numeral 2 (during the invariance training performed by the invariance manager 104). For example, the gradient applied to each redundant neuron is constrained to the sub-space.

By training only the redundant neurons, the non-redundant neurons that learned to perform task 1 (e.g., neurons N1-N3) are essentially frozen. Because the redundant neurons are trained by the training manager 106, and the non-redundant neurons have been fine-tuned during invariance training (by the invariance manager 104), the accuracy of the non-redundant neurons in performing task 1 remains static. Training the redundant neurons, and freezing the non-redundant neurons leverages the compositional nature of a neural network to minimize catastrophic forgetting. For example, the task 2 neurons (e.g., N4-N5) learn to perform task 2 given the predictable behavior (e.g., a "backdrop") of the task 1 neurons (e.g., N1-N3). The behavior of the task 1 neurons is not changed over time because the neurons have undergone invariance training and are not updated during training of task 2. In some embodiments, the task 1 neuron behavior of neurons (N1-N3) injects a predictable amount of noise into the training data of task 2, and the task 2 neurons (N4-N5) learn to correct the noise produced by the task 1 neurons to perform task 2. In other embodiments, the task 2 neurons use the predictable behavior of the task 1 neurons to perform task 2. For example, the task 2 neurons can learn a task that builds on the behavior of the task 1 neurons. Specifically, given a computer vision task, the task 1 neurons may learn vertical edge features. The task 2 neurons, at a deeper layer in the neural network model than the task 1 neurons, capture the vertical edge features determined from the task 1 neurons and use such features to segment objects (e.g., task 2). In this manner, the task 2 neurons use the behavior of task 1 to segment objects without learning how to identify vertical edge features.

The result of the training manager 106 is a task 1 and task 2 trained neural network model 122. Neurons N1-N3, the non-redundant neurons, are re-trained (e.g., fine-tuned) to perform task 1 (as indicated by black circles), while neurons N4-N5 are trained to perform task 2 (as indicated by the white circles). In some embodiments, the task 1 and task 2 trained neural network model 122 is fed back to the partition manager 102 such that the partition manager 102 can identify redundant neurons and non-redundant neurons of the task 2 neurons (e.g., neurons N4-N5). Subsequently, the process is repeated on the non-redundant neurons and redundant neurons of task 2 to train the task 1 and task 2 trained neural network model 122 to learn task 3. The processes described herein can be repeated iteratively to identify neurons of a neural network to teach a new task.

FIG. 2 illustrates a diagram of training a neural network architecture to perform multiple tasks using the task management system, in accordance with one or more embodiments. As described herein, the task management system 100 may operate on any neural network model.

At numeral 1, the task management system 100 receives to a fully connected neural network model 220. Unlike the fully connected neural network model of FIG. 1, the fully connected neural network model of FIG. 2 is untrained. At numeral 2, training manager 106 receives the neural network model 220. The training manager 106 trains the neural network model 220 to perform a task using any suitable mechanism. For example, the training manager 106 may train the neural network model 220 using supervised learning to perform task 1. Supervised learning is a method of training a machine learning model given input-output pairs. An input-output pair is an input with an associated known output (e.g., an expected output, a labeled output, a ground truth). In some embodiments, the training manager 106 obtains input-output pairs by querying a data store for clean data and corresponding corrupt/noisy data, data and corresponding labels of such data, and the like. For example, task 1 may be an image classification task, in which the neural network model 220 is trained to classify images of mammals using task 1 training data. The task 1 training data may include images of mammals (e.g., inputs) and corresponding labels of the images (e.g., outputs).

At numeral 3, the partition manager 102 receives the neural network model 220. Operations of the partition manager 102 are described above with reference to FIG. 1. In some embodiments, the neural network model 220 is passed to the partition manager 102 after training by the training manager 106 has completed training the neural network model 220. For example, a number of training iterations may have been reached, an error of the neural network model 220 is within a threshold, and the like. In other embodiments, the partition manager 102 operates on the neural network model 220 during training. For example, the training manager 106 passes the neural network model 220 to the partition manager 102 every threshold number of iterations, epochs, and the like. As described herein, the partition manager 102 partitions the neural network model 220 into a partitioned neural network with a set of redundant neurons and a set of non-redundant neurons.

At numeral 4, the invariance manager 104 fine tunes the neural network 220 for a second round of training. During the second round of training (e.g., fine tuning), the invariance manager 104 fine tunes the neural network model 220 using the previously trained task (e.g., the task trained by the training manager 106 at numeral 2). For example, the task 1 training data is applied to the neural network model 220 again. As described herein, the task 1 training data may include images of mammals and corresponding labels of each image. In some embodiments, the invariance manager 104 queries the training manager 106 for the task 1 training data. In other embodiments, the invariance manager 104 queries a data store for the task 1 training data.

As described herein, also during numeral 4, the invariance manager 104 perturbs each of the redundant neurons during each iteration of training (e.g., each input-output pair of task 1 training data). In some embodiments, the invariance manager 104 perturbs each of the redundant neurons every threshold number of iterations, batches, epochs and the like. As described herein, the invariance manager 104 may constrain the perturbations applied to the redundant neurons. Both perturbing the redundant neurons and retraining the non-redundant neurons results in a refined neural network model whose neurons are operationally independent, although still fully connected.

At numeral 5, the training manager 106 trains the neural machine learning model to perform a next task. The training manager 106 may train the neural network model to perform task 2 using any suitable mechanism. For example, the training manager 106 may train the neural network model 120 using supervised learning to perform task 2. Task 2 may be a different image classification task from the image classification task 1. For example, while task 1 classified images of mammals, task 2 may classify images of fish. Additionally or alternatively, task 2 may be a different task altogether such as an object detection task, a segmentation task, and the like. The training manager 106 may query a data store (the same data store of a different data store) to obtain task 2 training data.

At numeral 6, the neural network model 120 is passed to the partition manager 102. The partition manager may perform any suitable method of partitioning neurons in each layer of the neural network model 120. Similar to the partitioning performed at numeral 3, the partition manager partitions the trained neurons into two sets of neurons. In this manner, the partition manager 102 identifies redundant and non-redundant neurons associated with learning task 2.

At numeral 7, the invariance manager 104 trains the neural network 220 for a second round of task 2 training. The second round of task 2 training is performed similarly to the second round of task 1 training. That is, the invariance manager 104 fine tunes the non-redundant neurons of task 2 (determined by the partition manager 102 at numeral 4) and perturbs the redundant neurons of task 2.

Using the processes described herein, the task management system 100 trains a machine learning model (such as a neural network) to perform multiple tasks without decreasing the machine learning model's ability to perform tasks in which the machine learning model has been previously trained on. For example, the accuracy in performing both task 1 and task 2 satisfy one or more accuracy thresholds. As shown, various tasks (e.g., task 1 and task 2) are sequentially learned by the neural network model 220. Each task is learned by recursively applying some combination of a training manager 106, a partition manager 102, and an invariance manager 104. The tasks learned by the neural network model 220 results in a subset of neurons of the neural network model 220 learning to perform the task. As a result, for N tasks learned by the neural network model 220, there may be N subsets of neurons.

At numeral 8, after partitioning the neural network model 220 into N subsets for each of N tasks, the task management system 100 outputs trained neural network model 222. The trained neural network model 222 may be deployed to perform the tasks, as described with reference to FIG. 4.

In some embodiments, the task management system 100 executes the training manager 106, the partition manager 102, and the invariance manager 104 such that the neural network model 220 learns a task offline. That is, the task management system 100 may train the neural network model 220 to learn task 1 at a first time period. At a second time period, the task management system 100 may execute the training manager 106, the partition manager 102, and the invariance manager 104 such that the neural network model 220 learns task 2. In some embodiments, breaking up the training between the first task and the second task is beneficial. For example, the training data of task 2 may not be obtainable by the training manager 106. The task management system 100 may execute the training manager 106, the partition manager 102, and the invariance manager 104 to train the neural network model 220 to learn task 1 such that the neural network model is "primed" and ready to learn task 2 (e.g., the redundant and non-redundant neurons of task 1 have been identified, and the non-redundant neurons have been trained using invariance training). When the task 2 training data becomes obtainable by the training manager 106 at a second time, the task management system 100 executes the training manager 106, the partition manager 102, and the invariance manager 104 to train the neural network model 220 to learn task 2. By priming the neural network model 220 for task 2, the time it takes the neural network model 220 to learn task 2 without forgetting task 1 is reduced.

In some embodiments, the task management system 100 is configured to receive configuration parameters. One or more users may configure preferences and/or otherwise configure the parameters of the task management system 100. For example, the task management system 100 may receive a one or more constraints to be applied to redundant neurons of the neural network model 220.

The task management system 100 is also configured to store data utilized during the execution of the task management system 100. For example, the task management system 100 can store constraints, neurons identified as redundant, neurons identified as non-redundant, a degree of similarity between each neuron in a layer (e.g., in a similarity matrix), a magnitude and direction of each neuron in a neural network model, and the like.

In some implementations, the task management system 100 hosts the one or more modules of the task management system 100 (e.g., the training manager 106, the partition manager 102, and/or the invariance manager 104). In these implementations, the task management system 100 executes local processors/memory to perform one or more functions of the one or more modules. In other implementations, the task management system 100 remotely accesses the one or more modules. For example, the task management system 100 may call one or more servers, processors, etc. hosted in a cloud computing environment. In these implementations, the task management system 100 calls one or more other systems, processors, service providers, etc., to perform one or more functions of the modules of the task management system 100.

FIG. 3 illustrates an example of a partitioned neural network, in accordance with one or more embodiments. As shown neural network 302 is a partitioned neural network including five neurons in an input layer (e.g., N1-N5), three neurons in a hidden layer, and one neuron in an output layer. The partition manager 102 has partitioned the trained neural network 302 to distinguish redundant neurons (N4-N5) and non-redundant neurons (N1-N3) associated with performing the learned task. As described herein, the non-redundant neurons drive the accuracy of the neural network 302 in performing the learned task (e.g., the non-redundant neurons affect the performance of the neural network satisfying a threshold accuracy). The redundant neurons N4-N5 are neurons that do not significantly drive the neural network 302 accuracy in performing the learned task (e.g., the redundant neurons do not affect the performance of the neural network satisfying a threshold accuracy).

For the sake of simplicity, the neurons N1-N5 are illustrated in a two-dimensional vector in graph 312. During training, neurons learn a weight to apply to the input, where the weight of each neuron is depicted as a vector. As shown in graph 312, each neuron has a magnitude and direction. Neurons N1-N3 learn the features of the learned task, contributing to the accuracy of the neural network model performing the task. As shown, neurons N4-N5 are capturing redundant features, indicated visually by their similar magnitude and direction as neuron N1. As described herein, redundant neurons can be determined using any similarity mechanism such as a regularized cosine similarity. When neurons are similar, they may be capturing similar information and therefore redundant.

Figure 4:
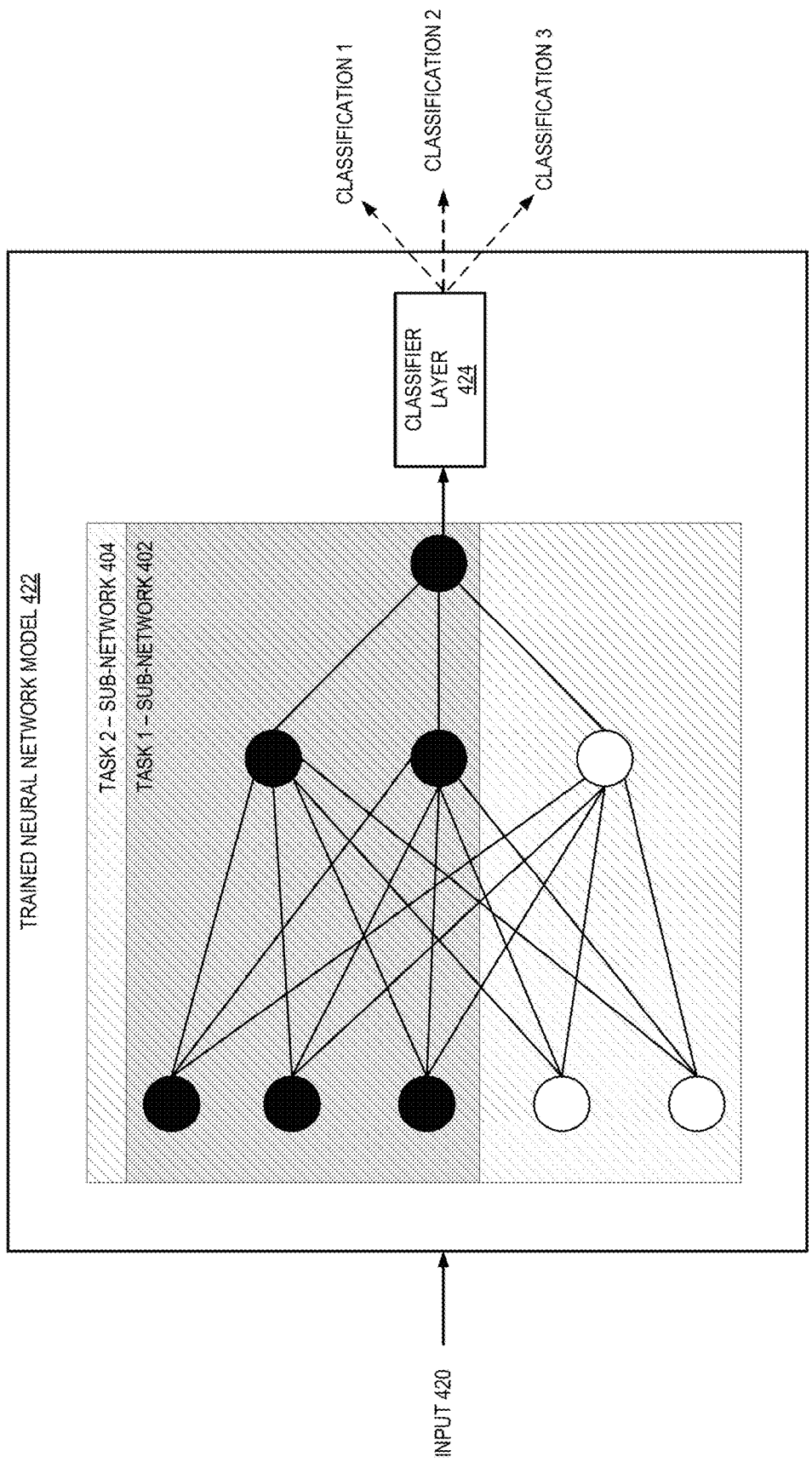
FIG. 4 illustrates an example deployment of a trained neural network model, in accordance with one or more embodiments.

FIG. 4 illustrates an example deployment of a trained neural network model, in accordance with one or more embodiments. The trained neural network model 422 is the neural network model trained using the task management system 100. As such, the trained neural network model 422 has learned to perform various tasks (e.g., task 1 and task 2) without degrading the accuracy of previously learned tasks. The trained neural network model 422 includes sub-networks 402 and 404, each sub-network including an optimized number of neurons to perform the specific task associated with the corresponding sub-network. As a result of the training performed using the task management system 100, the trained neural network may receive an input 420 and subsequently determine an output based on the learned task associated with the output. Because each sub-network 402 and 404 of the neural network model 422 is trained with the backdrop of the other sub-networks, and because each sub-network is invariant of the other networks, the trained neural network model 422 does not need to receive any indication of the type of task to be performed, the sub-network to activate, or the like. As explained herein, the neurons of sub-network 404 of task 2 operate according to the predicted behavior of the neurons of sub-network 402 of task 1.

In an example, the task management system 100 may train the neural network model 422 to classify mammals in an image as task 1, and the task management system 100 may train the neural network model 422 to classify fish in an image as task 2. The output layer of the trained neural network model 422 outputs a vector of real numbers to a classifier layer 424. In the example, the vector may include a number of elements equal to the number of tasks learned by the trained neural network model 422. Each element of the vector is a real number produced by the sub-networks of the trained neural network model 422. The classifier layer 424 may apply any one or more functions to transform the vector of real numbers into a probability distribution over predicted output classes. In the above example, output classes include classification 1 (e.g., mammal classification), classification 2 (e.g., fish classification), and classification 3 (e.g., neither mammal nor fish classification). The classifier layer 424 may execute a softmax function (if there are multiple classes) or a sigmoid function (if there are binary classes). In the example, the classifier executes a softmax function to classify the input image into one of three classifications described above, using an output determined by sub-network 404 and sub-network 402.

While described as being an image, it should be appreciated that the input 420 may be any medium used during training of the neural network model 422 (e.g., audio, text, video, etc.). Similarly, the output is any output learned to perform a task (e.g., a classification, a prediction, a detection, etc.)

Figure 5:
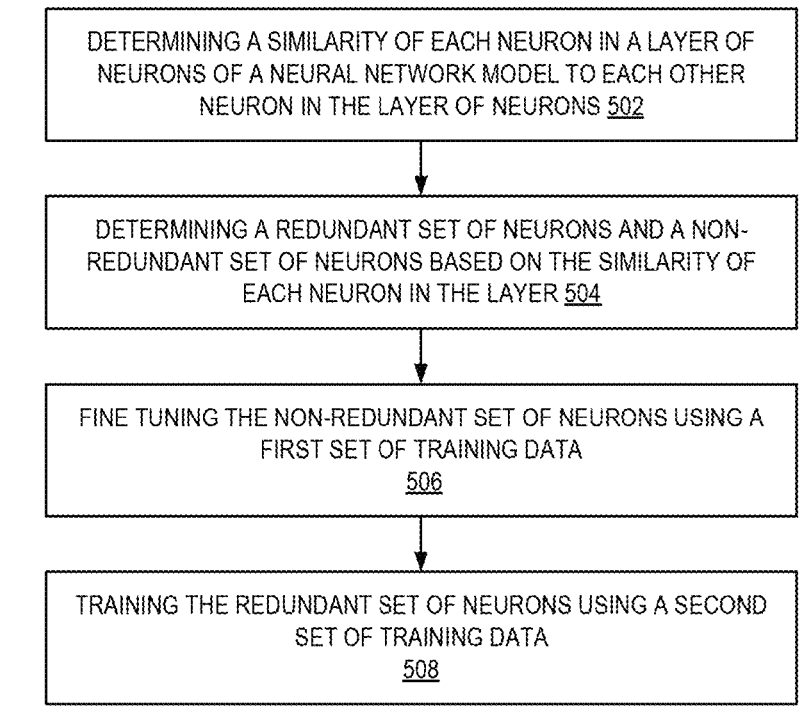
FIG. 5 illustrates a flowchart of a series of acts in a method of training a neural network to sequentially learn tasks while minimizing catastrophic forgetting, in accordance with one or more embodiments.

FIGS. 1-4 provide a number of embodiments and components configured to perform such embodiments that allow for training a neural network to sequentially learn tasks while minimizing catastrophic forgetting. FIG. 5 illustrates a flowchart of an example method of training a neural network to sequentially learn tasks while minimizing catastrophic forgetting, in accordance with one or more embodiments. It should be appreciated that FIG. 5 may be performed with additional or fewer steps than those indicated in FIG. 5. Moreover, the order of the steps indicated in FIG. 5 may be rearranged without changing the scope of FIG. 5.

FIG. 5 illustrates a flowchart 500 of a series of acts in a method of training a neural network to sequentially learn tasks while minimizing catastrophic forgetting, in accordance with one or more embodiments. In one or more embodiments, the method 500 is performed in a digital medium environment that includes the task management system 100.

As illustrated in FIG. 5, the method 500 includes an act 502 of determining a similarity of each neuron in a layer of neurons of a neural network model to each other neuron in the layer of neurons. As described herein, the partition manager 102 can use cosine similarity or any other similarity technique to create clusters of similar neurons in a layer of the neural network model. Neurons that satisfy a threshold similarity score are clustered, creating clusters of similar neurons.

As illustrated in FIG. 5, the method 500 includes an act 504 of determining a redundant set of neurons and a non-redundant set of neurons based on the similarity of each neuron in the layer. As described herein, the partition manager 102 can partition the neural network into redundant sets of neurons and non-redundant sets of neurons. The non-redundant neurons are the neurons that drive the neural network to perform a task. Specifically, these neurons are identified as neurons that are not similar to other neurons. In other words, each neuron that is not clustered into a cluster of similar neurons is identified as being a non-redundant neuron. Additionally, the partition manager 102 selects a neuron from each cluster of similar neurons to identify a non-redundant neuron from the cluster of similar neurons. The redundant neurons are the neurons that result in the overparameterization of the neural network. As described herein, the redundant neurons are trained for task 1, but do not affect the accuracy of the neural network in performing task 1 well. The redundant neurons are not necessary for inference. The partition manager 102 identifies neurons in the redundant neuron set as any remaining neurons (e.g., any neuron that has not been identified as being non-redundant) in a cluster of similar neurons.

As illustrated in FIG. 5, the method 500 includes an act 506 of fine tuning the non-redundant set of neurons using a first set of training data. As described herein, the invariance manager 104 fine tunes the non-redundant neurons using data that the neural network model was previously trained on. For instance, the invariance manager 104 applies the backpropagation algorithm to the non-redundant neurons only. In this manner, the invariance manager 104 reinforces the learning of the non-redundant neurons in performing the first task.

As illustrated in FIG. 5, the method 500 includes an act 508 of training the redundant set of neurons using a second set of training data. As described herein, the training manager 106 trains the redundant neurons to perform a second task. For instance, the training manager 106 applies the backpropagation algorithm to the redundant neurons only. In this manner, the training manager 106 trains the redundant neurons of the first task to perform the second task.

Figure 6:
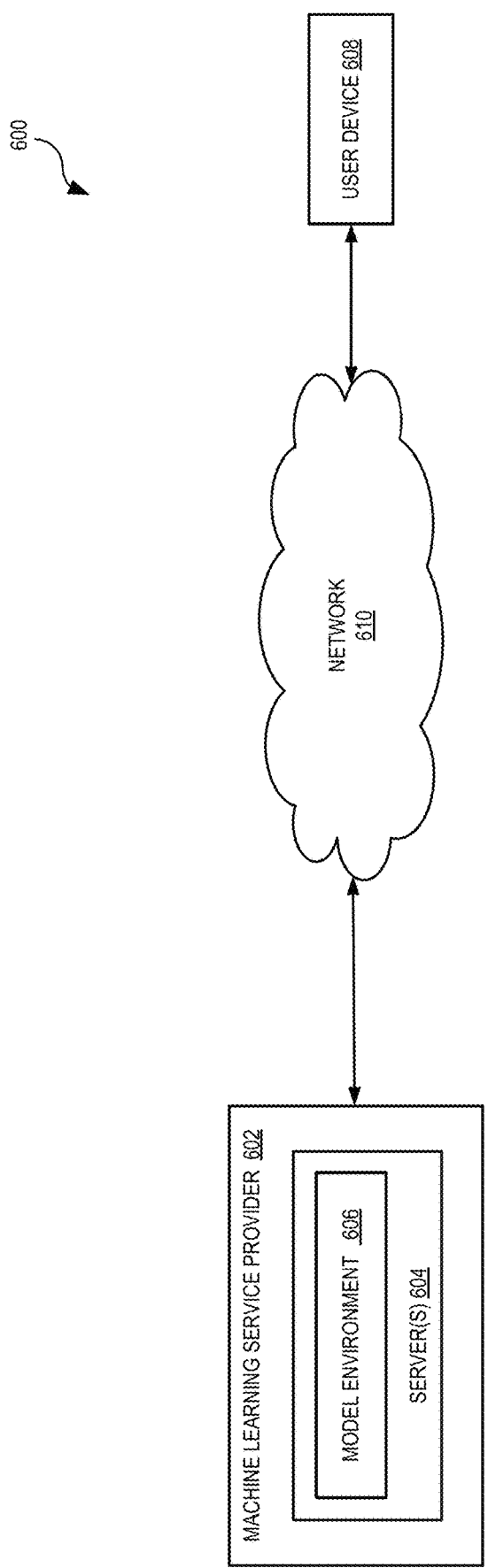
FIG. 6 illustrates a schematic diagram of an environment in which the task management system can operate in accordance with one or more embodiments.

FIG. 6 illustrates a schematic diagram of an environment 600 in which the task management system 100 can operate in accordance with one or more embodiments. As shown, the environment 600 includes a machine learning service provider 602 communicating with a user device 608 via a network 610. It should be appreciated that while the user device 608 is shown communicating with the machine learning service provider 602 via network 610, the user device 608 may also communicate directly with the machine learning service provider 602. The communication between the user device 608 and the machine learning service provider 602 via network 610 may be any communication such as wireless communication and/or wired communication. In an example implementation, the machine learning service provider 602 may host the machine learning system on a server 604 using the model environment 606 and receive data from one or more user device(s) 608 via network 610.

The machine learning service provider 602 may be a service provider configured to perform one or more tasks. The machine learning service provider 602 includes one or more server(s) 604 each including a model environment 606. Each of the servers may be specialized to perform a given task of the machine learning service provider 602. Accordingly, each server 604 has a unique model environment 606 that facilitates the operation of the server. The model environment 606 may include any data necessary to perform the operations of the specific server 604 (e.g., trained machine learning models, training data, machine learning libraries, machine learning functions, etc.). In other configurations, a single server may be configured to perform multiple tasks of the machine learning service provider 602. That is, the server 604 may include multiple model environments 606.

The user device 608 may be any computing devices configured to communicate data to the machine learning service provider 602. In some implementations, the user device 608 may capture or otherwise collect such data (e.g., using a camera, a microphone, some combination, or other sensor).

To illustrate, data from one or more user device(s) 608 (e.g., an interaction with an application executing the task management system 100) may be fed to server 604 via network 610. Upon receiving the data, such as a request to execute the task management system 100, the server 604 can execute the model environment 606 to execute the task management system 100. Upon receiving a request to execute the task management system 100, the one or more servers 604 can perform the methods and processes described above to train a neural network model using the task management system 100.

In some embodiments, the data obtained by the server 604 includes the neural network model to be trained or an indication of how the server 604 may obtain the neural network model. Similarly, the data may include training data. For example, the data may point to a particular memory address storing the neural network to be trained, a URL address hosting the training data, etc. The server 604 can obtain the neural network (and in some cases training data) and train the neural network model. In some embodiments, the server 604 is configured to transmit training updates (e.g., status, errors, etc.) to the user via the user device 608.

In some embodiments, the functions of the machine learning service provider 602 may be implemented via a user device 608. Additionally or alternatively, the functions of the user device 608 may be implemented via the machine learning service provider 602. The functions of the user device 608 and/or machine learning service provider 602 may be implemented in hardware, software, or both. For example, the user device 608 and/or machine learning service provider 602 may include instructions stored on a computer-readable storage medium and executable by processors of the user device 608 and/or machine learning service provider 602. Computer executable instructions may include instructions that cause one or more processors to perform one or more functions. The computer executable instructions may be stored in any computer-readable media accessible by one or more processors of the machine learning service provider 602 and/or the user device 608. In some embodiments, one or more portions of functions of the user device 608 and/or machine learning service provider 602 may be implemented in hardware, software, or both.

While one user device 608 is shown, it should be appreciated that multiple user devices 608 may communicate with the machine learning service provider 602 via network 610. Additionally or alternatively, multiple user device 608 may communicate with each other (e.g., without communicating with machine learning service provider 602). Moreover, while one machine learning service provider 602 is shown, it should be appreciated that multiple machine learning service providers 602 may communicate with one or more user devices 608. Similarly, multiple machine learning service providers 602 may communicate with each other (e.g., without communicating with the user device 608).

Figure 7:
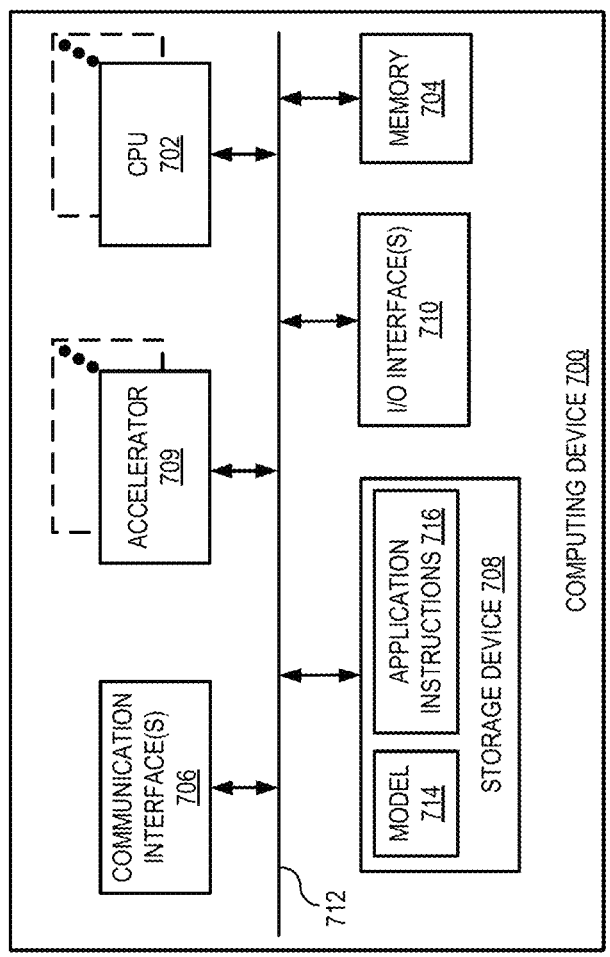
FIG. 7 illustrates a block diagram of an example computing device in accordance with one or more embodiments.

FIG. 7 illustrates a block diagram example computing device 700 that may be configured to perform one or more of the processes described above. One or more computing devices such as the computing device 700 may implement one or more portions of the task management system 100. As shown in FIG. 7, the computing device can comprise one or more central processing units (CPUs) 702, memory 704, one or more communication interfaces 706, a storage device 708, one or more I/O interfaces 710 and one or more accelerators 706. It should be appreciated that the computing device 700 can include different components than those shown in FIG. 7.

In particular embodiments, CPU(s) 702 include hardware and/or software for executing instructions. Similarly, accelerator(s) 706 include hardware and/or software for executing instructions. In some embodiments, accelerator(s) 706 include one or more graphics processing units (GPUs). In general, the accelerator(s) 706 and CPU(s) 702 fetch data from the storage device 708 and/or memory 704. For example, the accelerator(s) 709 and CPU(s) 702 may fetch instructions from the storage device 708 and/or memory 704 and execute one or more functions identified by the instructions. The CPU(s) 702 and/or accelerator(s) 709 execute the instructions to perform the one or more processes as described herein. For example, CPU 702 may receive instructions from memory 704 (e.g., non-transitory computer readable medium) and execute those instructions, resulting in one or more processes described herein.

The storage device 708 and/or memory 704 may include non-transitory computer readable memory such as non-volatile and/or non-volatile memory (RAM, ROM, EEPROM, CD ROM, SSDs, flash memory. The storage device 708 and/or memory 704 may be configured to store different types of data fetched by the CPU 702 and/or accelerator 709. For example, the memory 704 may include instructions directed to the functional operation of the computing device 700. Moreover, the storage device 708 may include application instructions 716 and/or models 714 directed to the applicational use of the computing device 700. For example, the model 714 may include the task management system 100 as described herein. The application instructions 716 may contain instructions necessary to perform the functions of the machine learning system.

The computing device 700 can further include one or more communication interfaces 706. A communication interface 706 can include hardware, software, or both configured to facilitate external communication with one or more external computing devices. The external communication with one or more external computing devices may be wireless communication and/or wired communication. The communication interface 706 may be configured to facilitate such wired/wireless communication.

The bus 712 can facilitate internal communication of the computing device 700 and may comprise hardware, software, or both, coupling components of computing device 700 to each other.

The computing device 700 also includes one or more input or output ("I/O") interfaces 710. The I/O interface 710 is configured to receive inputs/outputs. In an example implementation, the I/O interface 710 may receive user inputs (e.g., one or more preferences/configurations associated with the machine learning system 70, as described herein). Additionally or alternatively, the I/O interface 710 may receive sensor inputs (e.g., camera images, video frames, etc.). The I/O interface 710 may be configured to output one or more graphics/displays to a user using a display. Additionally or alternatively, the I/O interface 710 may be configured to output data (e.g., an output associated with a performed application, such as performing the task management system 100) to one or more other computing devices.

Various embodiments have been described and illustrated. The descriptions and illustrations herein are not to be construed as limiting. Alternate embodiments may exist without departing from the scope of the embodiments described and illustrated herein.

Disjunctive language such as "at least one of A, B, or C" is not intended to imply that a given embodiment requires at least one of A, at least one of B, or at least one or C. Instead, it is intended to be understood to mean either A, B, or C, or any combination thereof.

What is claimed is:

1. A method comprising:
   comparing each neuron's weight vector in a layer of neurons of a neural network model to each other neuron's weight vector in the layer of neurons to determine a similarity of each neuron to each other neuron in the layer;
   determining a redundant set of neurons and a non-redundant set of neurons based on the similarity of each neuron in the layer;
   fine tuning the non-redundant set of neurons using a gradient of a neuron of the non-redundant set of neurons determined using a first set of training data, wherein the gradient is backpropagated to the neuron of the non-redundant set of neurons;
   applying a perturbation to the redundant set of neurons during the fine tuning of the non-redundant set of neurons, wherein the perturbation is a random perturbation; and
   training the redundant set of neurons using a gradient of a neuron of the redundant set of neurons determined using a second set of training data, wherein the gradient is backpropagated to the neuron of the redundant set of neurons.

2. The method of claim 1, wherein determining the redundant set of neurons and the non-redundant set of neurons based on the similarity of each neuron in the layer, further comprises:
   creating a cluster of similar neurons responsive to determining that two or more neurons in the layer satisfy a threshold similarity score, wherein the cluster of similar neurons is the redundant set of neurons; and
   determining the non-redundant set of neurons as any neuron in the layer that is not in the cluster of similar neurons.

3. The method of claim 2, wherein determining the non-redundant set of neurons further comprises:
   selecting a neuron from the cluster of similar neurons for the non-redundant set of neurons.

4. The method of claim 1, wherein the perturbation is constrained to be within a sub-space.

5. The method of claim 1, wherein the first set of training data is used to teach the neural network model to perform a first task and the second set of training data is used to teach the neural network model to perform a second task.

6. The method of claim 1, further comprising:
   determining a similarity of each neuron in the redundant set of neurons in the layer of the neural network model to each other neuron in the redundant set of neurons in the layer;

determining a second redundant set of neurons and a second non-redundant set of neurons based on the similarity of each redundant neuron in the layer;

fine tuning the second non-redundant set of neurons using the second set of training data; and training the second redundant set of neurons using a third set of training data.

7. A system comprising:

a memory component; and a processing device coupled to the memory component, the processing device to perform operations comprising:

comparing each neuron's weight vector in a layer of neurons of a neural network model to each other neuron's weight vector in the layer of neurons to determine a similarity of each neuron to each other neuron in the layer;

determining a redundant set of neurons and a non-redundant set of neurons based on the similarity of each neuron in the layer;

fine tuning the non-redundant set of neurons using a gradient of a neuron of the non-redundant set of neurons determined using a first set of training data, wherein the gradient is backpropagated to the neuron of the non-redundant set of neurons;

applying a perturbation to the redundant set of neurons during the fine tuning of the non-redundant set of neurons, wherein the perturbation is a random perturbation; and training the redundant set of neurons using a gradient of a neuron of the redundant set of neurons determined using a second set of training data, wherein the gradient is backpropagated to the neuron of the redundant set of neurons.

8. The system of claim 7, wherein determining the redundant set of neurons and the non-redundant set of neurons based on the similarity of each neuron in the layer, further comprises:

creating a cluster of similar neurons responsive to determining that two or more neurons in the layer satisfy a threshold similarity score, wherein the cluster of similar neurons is the redundant set of neurons; and determining the non-redundant set of neurons as any neuron in the layer that is not in the cluster of similar neurons.

9. The system of claim 7, wherein the perturbation is constrained to be within a sub-space.

10. The system of claim 7, wherein the first set of training data is used to teach the neural network model to perform a first task and the second set of training data is used to teach the neural network model to perform a second task.

11. The system of claim 7, wherein the operations further comprise:

determining a similarity of each neuron in the redundant set of neurons in the layer of the neural network model to each other neuron in the redundant set of neurons in the layer;

determining a second redundant set of neurons and a second non-redundant set of neurons based on the similarity of each redundant neuron in the layer;

fine tuning the second non-redundant set of neurons using the second set of training data; and training the second redundant set of neurons using a third set of training data.

12. A non-transitory computer-readable medium storing executable instructions, which when executed by a processing device, cause the processing device to perform operations comprising:

comparing each neuron's weight vector in a layer of neurons of a neural network model to each other neuron's weight vector in the layer of neurons to determine a similarity of each neuron to each other neuron in the layer;

determining a redundant set of neurons and a non-redundant set of neurons based on the similarity of each neuron in the layer;

fine tuning the non-redundant set of neurons using a gradient of a neuron of the non-redundant set of neurons determined using a first set of training data, wherein the gradient is backpropagated to the neuron of the non-redundant set of neurons;

applying a perturbation to the redundant set of neurons during the fine tuning of the non-redundant set of neurons, wherein the perturbation is a random perturbation; and training the redundant set of neurons using a gradient of a neuron of the redundant set of neurons determined using a second set of training data, wherein the gradient is backpropagated to the neuron of the redundant set of neurons.

13. The non-transitory computer-readable medium of claim 12, wherein determining the redundant set of neurons based on the similarity of each neuron in the layer further comprises:

creating a cluster of similar neurons responsive to determining that two or more neurons in the layer satisfy a threshold similarity score, wherein the cluster of similar neurons is the redundant set of neurons; and determining the non-redundant set of neurons as any neuron in the layer that is not in the cluster of similar neurons.

14. The non-transitory computer-readable medium of claim 12, wherein the first set of training data is used to teach the neural network model to perform a first task and the second set of training data is used to teach the neural network model to perform a second task.

15. The non-transitory computer-readable medium of claim 12, storing instructions that further cause the processing device to perform operations comprising:

determining a similarity of each neuron in the redundant set of neurons in the layer of the neural network model to each other neuron in the redundant set of neurons in the layer;

determining a second redundant set of neurons and a second non-redundant set of neurons based on the similarity of each redundant neuron in the layer;

fine tuning the second non-redundant set of neurons using the second set of training data; and training the second redundant set of neurons using a third set of training data.

* * * * *